US012070857B2

(12) United States Patent
Fang

(10) Patent No.: US 12,070,857 B2
(45) Date of Patent: Aug. 27, 2024

(54) ROBOT PROGRAMMING

(71) Applicant: Intrinsic Innovation LLC, Mountain View, CA (US)

(72) Inventor: Jingyi Fang, Cupertino, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 235 days.

(21) Appl. No.: 17/700,133

(22) Filed: Mar. 21, 2022

(65) Prior Publication Data

US 2023/0294275 A1    Sep. 21, 2023

(51) Int. Cl.
*B25J 9/16* (2006.01)
*G06F 3/04845* (2022.01)
*G06F 3/04847* (2022.01)
*G06T 13/40* (2011.01)

(52) U.S. Cl.
CPC ........... *B25J 9/1605* (2013.01); *B25J 9/1664* (2013.01); *G06F 3/04845* (2013.01); *G06F 3/04847* (2013.01); *G06T 13/40* (2013.01); *G05B 2219/32128* (2013.01); *G05B 2219/39001* (2013.01); *G06T 2200/24* (2013.01)

(58) Field of Classification Search
CPC ...... B25J 9/1605; B25J 9/1664; B25J 9/1671; B25J 9/1656; G06F 3/04845; G06F 3/04847; G06T 13/40; G06T 2200/24; G05B 2219/39001; G05B 2219/40099; G05B 2219/40131
See application file for complete search history.

(56) References Cited

U.S. PATENT DOCUMENTS

| 9,687,983 | B1 | 6/2017 | Prats | |
|---|---|---|---|---|
| 2014/0195054 | A1* | 7/2014 | Kamiya | B25J 13/06 700/263 |
| 2015/0379171 | A1* | 12/2015 | Kuwahara | G06F 30/20 703/13 |
| 2018/0236657 | A1* | 8/2018 | Kuwahara | B25J 9/1671 |
| 2019/0329405 | A1* | 10/2019 | Atohira | G06T 17/00 |
| 2020/0262082 | A1* | 8/2020 | Schoessler | B25J 9/1005 |
| 2022/0355483 | A1* | 11/2022 | Lee | B25J 9/1666 |

FOREIGN PATENT DOCUMENTS

WO    WO 2021/045350    3/2021

OTHER PUBLICATIONS

Starke, Sebastian, "Memetic Evolution for Generic Full-Body Inverse Kinematics in Robotics and Animation", IEEE Transactions on Evolutionary Computation, vol. 23, No. 3, Jun. 2019, 406-420 (Year: 2019).*

International Search Report and Written Opinion in International Appln. No. PCT/US2023/015655, dated Jun. 23, 2023, 13 pages.

* cited by examiner

*Primary Examiner* — William A Beutel

(74) *Attorney, Agent, or Firm* — Fish & Richardson P.C.

(57) ABSTRACT

Methods, systems, and apparatus, including computer programs encoded on computer storage media, for robot programming. One of the methods comprises generating an interactive user interface that includes an illustration of a first virtual robot, the first virtual robot having an initial pose that defines respective joint angles of one or more joints of the first virtual robot; receiving user input data specifying a target pose of the first virtual robot; and generating an animation of the first virtual robot transitioning between the initial pose and the target pose.

20 Claims, 6 Drawing Sheets

ROBOT PROGRAMMING

BACKGROUND

This specification relates to robotics, and more particularly to robot programming.

Robot programming refers to determining the physical movements of robots in order to perform tasks. For example, an industrial robot that builds cars can be programmed to first pick up a car part and then weld the car part onto the frame of the car. Each of these actions can themselves include dozens or hundreds of individual movements by robot motors and actuators.

Robot programming has traditionally required immense amounts of manual programming, even in the case of using computer simulation to simulate how a robot should move in order to accomplish a particular task. A robot can include one or more robotics arms (referred to below as "links") connected by one or more joints. Each joint can be coupled to one or more actuators and can provide a range of motion for the robot. The robot can also include an end effector, e.g., a tool, attached to one of the links, e.g., to the end of one of the links.

In some cases, robot programming involves generating data that specifies a pose of the robot, i.e., data that specifies the position, the orientation, or both of the robot. For example, robot programming can involve generating, by a developer, a target end effector position for the end effector and a target orientation of the end effector. Typically, accurate and up-to-date knowledge of the pose of the robot, e.g., with reference to a target pose or another reference pose, is a prerequisite for robot programming that results in successful task performance by the robot.

SUMMARY

This specification describes systems and techniques that allow for developers to more easily generate control instructions for operating a robot. In particular, the techniques described in this specification allow a developer to efficiently define an end effector pose for manipulating an object by the robot.

Particular embodiments of the subject matter described in this specification can be implemented so as to realize one or more of the following advantages.

Using techniques described in this specification can dramatically reduce the amount of manual programming required in order to program robots. Some techniques described in this application allow developers to more efficiently define target poses (e.g., target end effector poses) that facilitate custom and precise object manipulation by one or more robots that fit their needs. In some examples, developers can generate pose data for a robot with a simple click-and-drag input, e.g., as opposed to the relatively time-demanding job that is otherwise required for fully specifying a full pose (position and orientation) of the end effector with the use of a teaching pendant, or through multiple trial-and-error entries on another input device. In some examples, while generating pose data, developers are presented with visually enhanced animations of the robot moving to the defined target pose. The visually enhanced animations make any delay in the actual robot control process less apparent to a human viewer. This enhances viewer experiences and makes robot programming easier.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
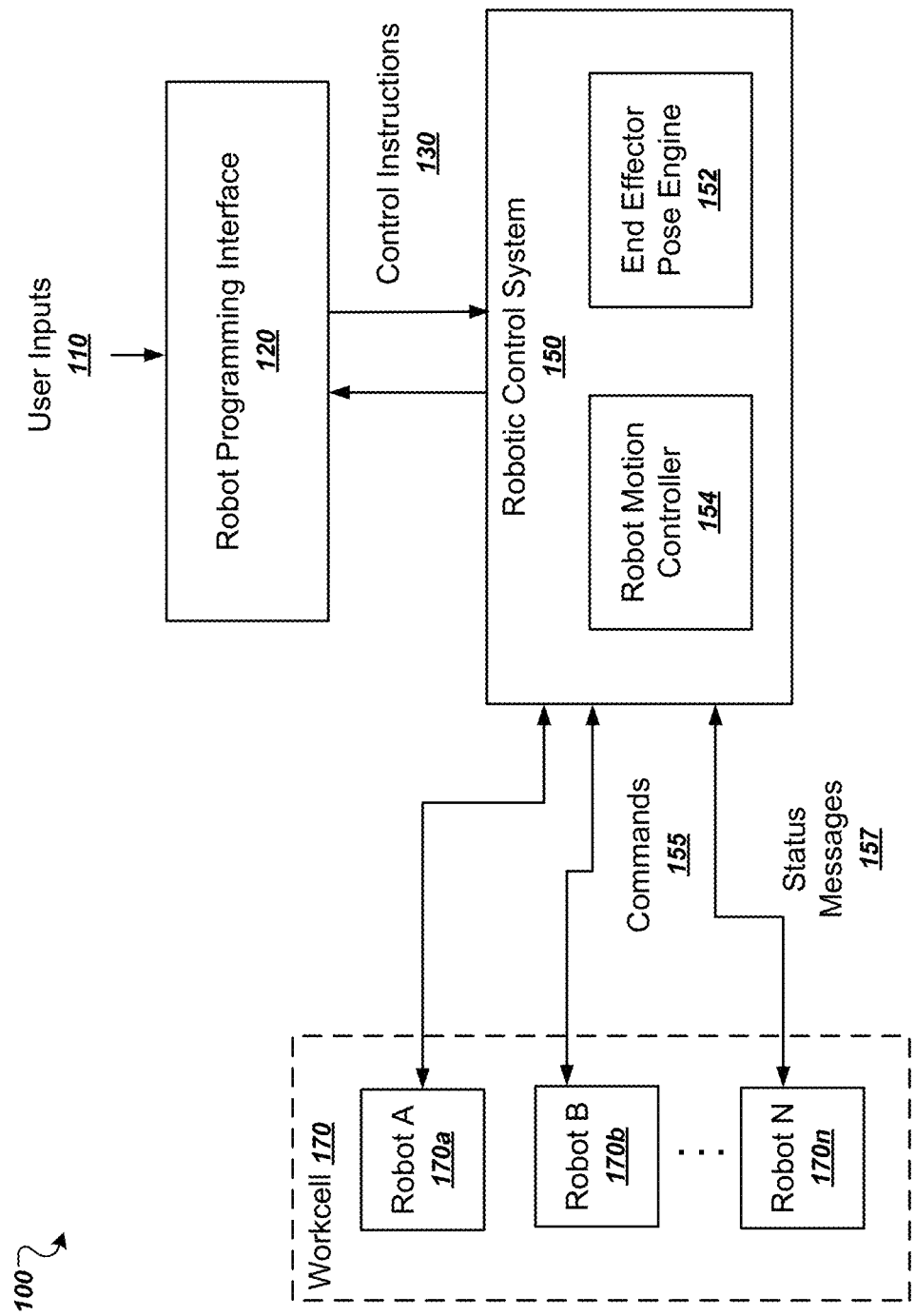
FIG. 1 is a diagram that illustrates an example system.

FIG. 1 is a diagram that illustrates an example system 100. The system 100 is an example of a system that can implement the robot programming techniques described in this specification.

The system 100 includes a number of functional components, including a robotic control system 150 that provides a robot programming interface 120 through which a user of the system, e.g., a developer, may generate control instructions 130 for operating the robots, e.g., by identifying robot actions, entering parameter values, or writing robot control program code. Each of these components can be implemented as computer programs installed on one or more computers in one or more locations that are coupled to each other through any appropriate communications network, e.g., an intranet or the Internet, or combination of networks. The system 100 also includes a workcell 170 that includes N robots 170a-n.

The robotic control system 150 is configured to control the robots 170a-n in the workcell 170. For example, the robotic control system 150 can execute the instructions entered by the developer through the robot programming interface 120 by issuing commands 155 to the workcell 170 in order to drive the movements of the robots 170a-n and receiving status messages 157 from the robots 170a-n.

In this specification, a robot is a machine having a base position, one or more movable components, and a kinematic model that can be used to map desired positions, poses, or both in one coordinate system, e.g., Cartesian coordinates, into commands for physically moving the one or more movable components to the desired positions or poses.

In this specification, an end effector (also referred to as a tool) is a device that is part of and is attached at the end of the kinematic chain of the one or more moveable components of the robot. Example end effectors include grasping end effectors (e.g., grippers), welding devices, gluing devices, and sanding devices.

In this specification, a task is an operation to be performed by an end effector. For brevity, when a robot has only one end effector, a task can be described as an operation to be performed by the robot as a whole. Example tasks include grasping, welding, glue dispensing, part positioning, and surfacing sanding, to name just a few examples.

The overall goal of the robot programming interface 120 is to enable the developer to more easily and accurately generate control instructions 130 for operating the robots 170a-n that allow the robots to successfully execute one or more tasks.

In this regard, the robotic control system 150 includes an end effector pose engine 152 that can generate, in cooperation with the robot programming interface 120, an end effector pose of an end effector of a robot (e.g., robot 170a, robot 170b, or another robot). As described herein, the end effector pose may be generated based on user inputs 110 received in response to providing an illustration of the robot to the robot programming interface 120 for presentation on a display screen of the system 150. The user inputs 110 may be generated by a developer by using one or more input devices in data communication with the system 150, e.g., a keyboard and a mouse, a joystick, a touch screen, a virtual reality, augmented reality, or mixed reality input device, or another handheld input device.

The end effector pose may define a pose for the robot end effector to manipulate an object to perform a task. In some examples, a pose of an end effector may reference a full six-dimensional ("6D") pose of the end effector that specifies both a position and an orientation of the end effector. In some of these examples, the position of the end effector may be the position of a reference point of the end effector. In some of these examples, the reference point of an end effector may be a center of mass of the end effector, and/or a point near where end effector attaches to other components of the robot, though this is not required.

Figure 2:
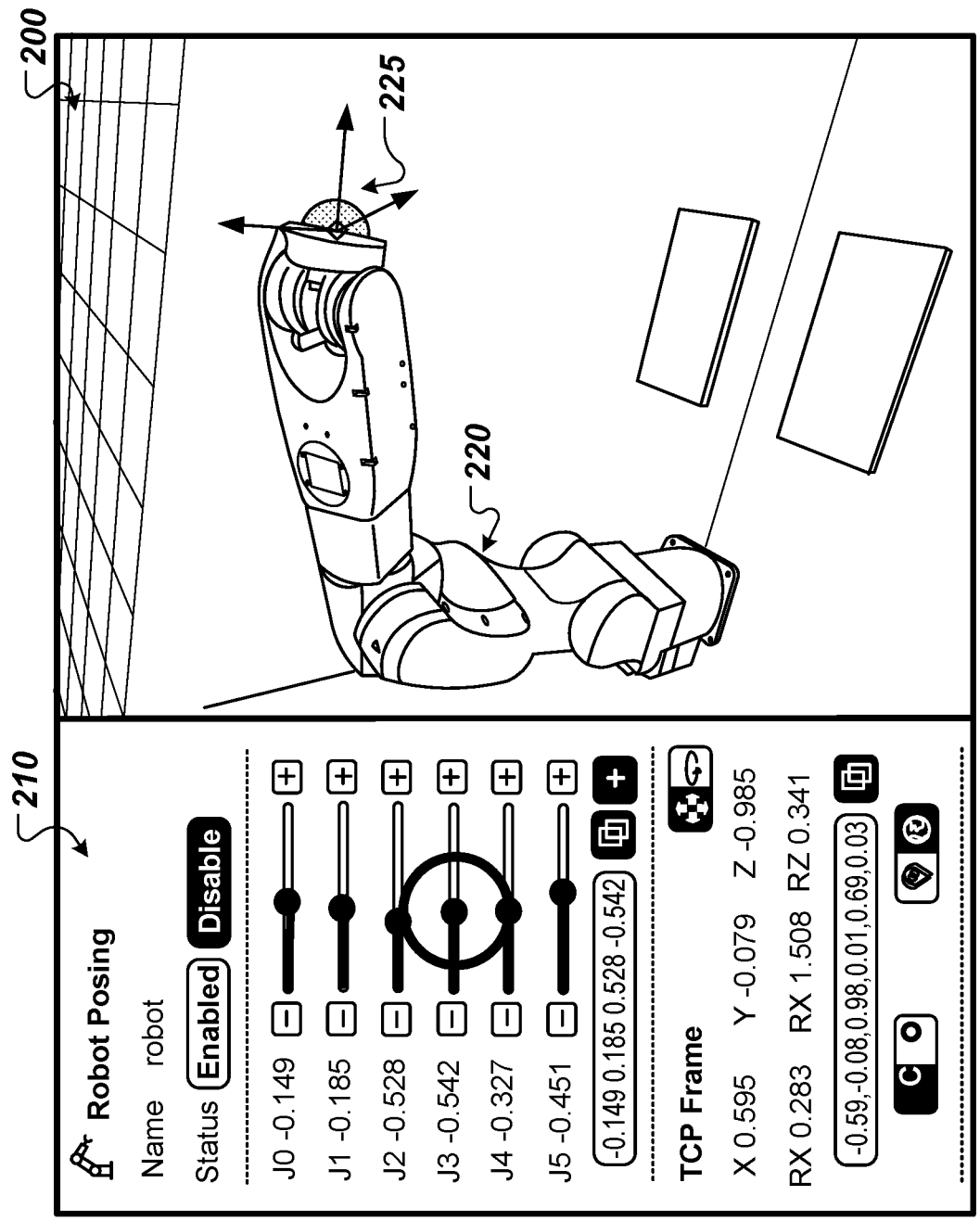
FIG. 2 illustrates an example interactive user interface for robot programming.

FIG. 2 illustrates an example interactive user interface for robot programming. The interactive user interface may be part of the robot programming interface 120 described above. As shown, the interactive user interface may include a display window 200 which shows a 3D view of a first virtual robot 220, including different components of the robot such as robot base, joints, links, and optionally, an end effector. In particular, in this example, the first virtual robot 220 is a virtual replica (sometimes also referred to as a "digital twin") of an actual robot in a robotic operating environment (e.g., robot 170a, robot 170b, or another robot in workcell 170). At any given time point, the first virtual robot 220 may have a same, current pose of the actual robot in the robotic operating environment.

The interactive user interface may also provide a visual programming interface 210 or some other different types of interface that may allow the user to enter input data that defines or otherwise specifies the target pose 225 of the robot (illustrated as the three arrows in FIG. 2). Input data collected using the visual programming interface 210 may be used to control the actual robot that corresponds to the first virtual robot 220 displayed within the display window 200.

In some implementations, the user inputs 110 may include information entered by the user, e.g., by using a mouse and keyboard, that directly defines or otherwise specifies the target pose of the robot. For example, the data may include a user-specified value of the target joint angle of each of one or more joints of the robot. As another example, the information may include user-specified values of the target position and the target orientation of the end effector of the robot with respect to a reference frame. The target position of the end effector can be any point in space, defined relative to the reference frame. For example, the target position of the end effector may indicate a "point of interest" for object manipulation, such as a grasp of the object. The target orientation of the end effector in the space can be described by attaching a coordinate system to the target position and then defining the rotation angles of its coordinate axes relative to the reference frame.

In some implementations, the user inputs 110 may include data generated by one or more drag operations performed by a user using a handheld input device of the system, e.g., a mouse, a touch screen, or a virtual reality, augmented reality, or mixed reality input device. Generally, a virtual reality, augmented reality, or mixed reality device has a head-mounted display having one or more display windows 200 that can be worn by a user to provide content to the user through the display window(s). The content may include the first virtual robot 220 and, in some implementations, a virtual or semi-virtual robotic operating environment that has the first virtual robot. In these implementations, the user may operate the device to interact with the displayed content to define a target pose of the robot, e.g., by dragging the first virtual robot 220 displayed within the display window 200 to move the first virtual robot from the current pose to the target pose, e.g., in order to perform the task.

Figure 3:
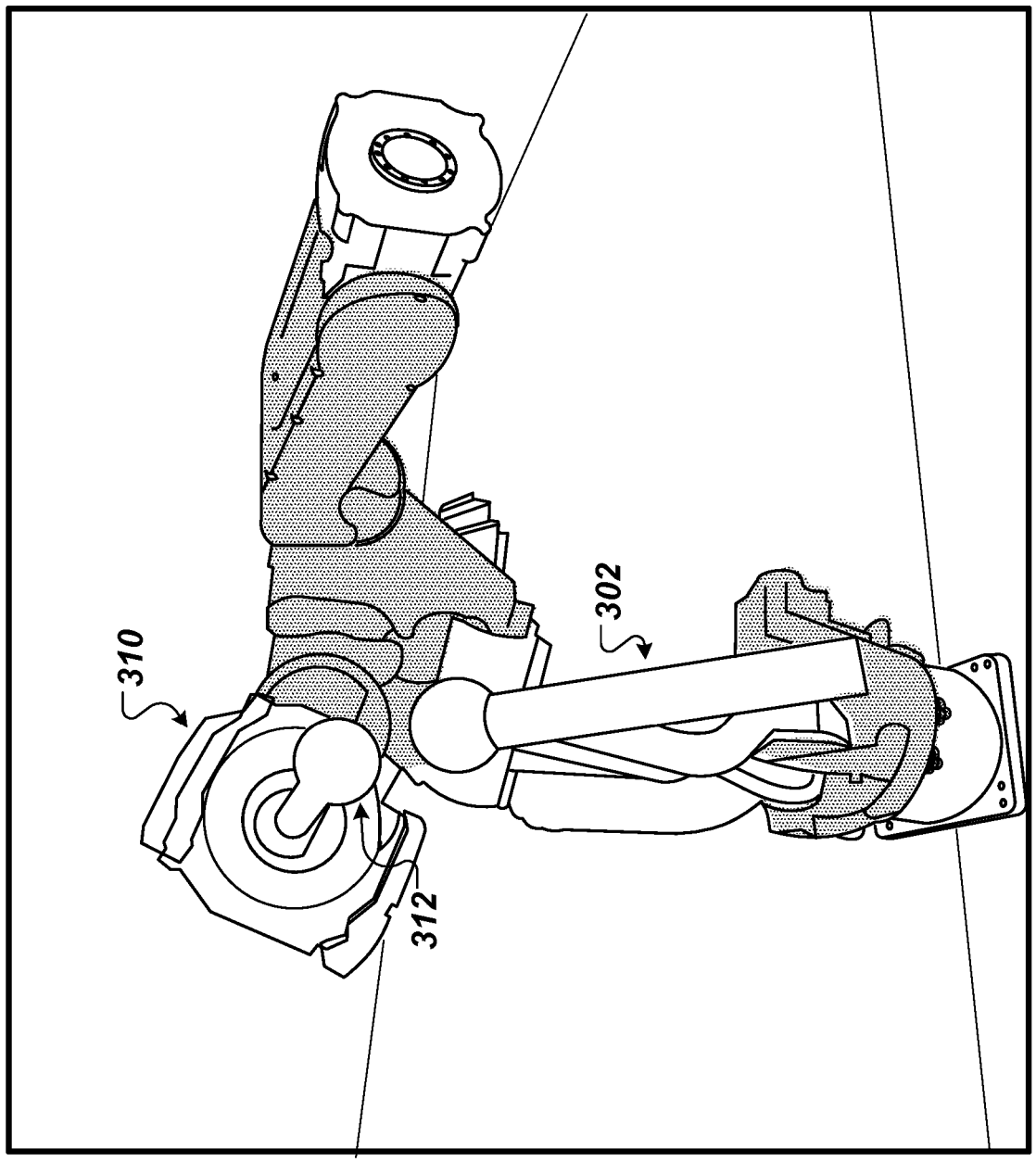
FIG. 3 illustrates another example interactive user interface for robot programming.

FIG. 3 illustrates another example interactive user interface for robot programming. As shown, a cursor 302 is displayed on a display window of the head-mounted display of a virtual reality, augmented reality, or mixed reality device. In the example of FIG. 3, a user may define a target pose 312 of the end effector of the first virtual robot 310 by dragging the cursor, e.g., through hand gesture-based or eye tracking-based interaction with the device.

In some of these implementations, the robotic control system 150 can then use an inverse kinematic (IK) solver to determine the parameters for each of one or more joints of the robot for each target pose of the robot end effector that has been defined or otherwise specified by the user inputs 110. The parameters for a joint can include an angle of the joint and, optionally, a position of the joint. The inverse kinematics solver implements software that is configured to calculate the values for the joint parameters that provide the target end effector pose based on a rigid body tree model that is specific to the robot. This model defines all the joint constraints of the robot that the solver enforces. If a solution is possible, the joint limits specified in the robot model are obeyed. Generally, there are both analytical and numerical solutions for inverse kinematics, and an IK solver may be configured to find either or both solutions. Analytical solutions suffer from an inability to generalize to tool-use scenarios or changes in robot configuration, as the solver must be constructed beforehand. Typically, numerical IK solvers are more generic in that they rely on a frequent, runtime approximation of the local inverse Jacobian in order to try to find joint solutions that come "close enough" to the desired Cartesian solution. Numerical IK solvers use the Newton method or similar to iterate until the solution is found.

The robotic control system 150 can then provide the joint parameters for the solution to a robot motion controller 154 that controls the motion of the robot. In turn, the robot motion controller can issue commands 155 that cause the joints to move into their target angles (and, in some implementations, target positions) using the joint parameters.

Figure 4:
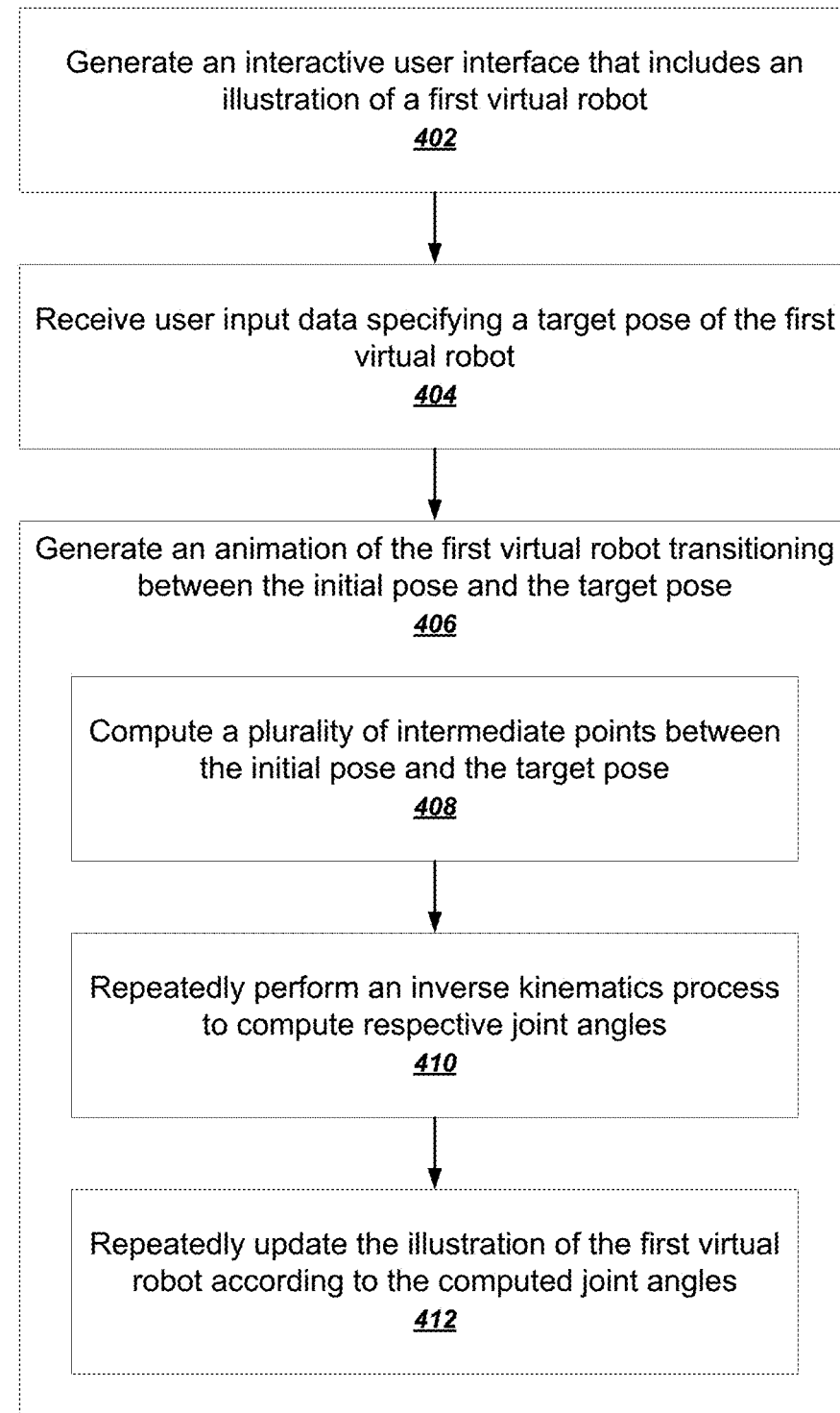
FIG. 4 is a flowchart of an example process for generating an interactive user interface for robot programming.

FIG. 4 is a flow diagram of an example process 400 for generating an interactive user interface for robot programming. For convenience, the process 400 will be described as being performed by a system of one or more computers located in one or more locations. For example, a system, e.g., the robotic control system 150 of FIG. 1, appropriately programmed, can perform the process 400.

The system generates an interactive user interface that includes an illustration of a first virtual robot (step 402). The interactive user interface is a graphical interface to be displayed on a display screen of the system that allows for controlling a robot by a user of the system. Using the provided interactive user interface, the user may be able to generate pose data for the robot and subsequently cause the robot to move to a desired target pose defined in the pose data.

As shown in the example of FIG. 4A, the interactive user interface shows a 3D view of a first virtual robot 420. At any given time point, the first virtual robot 420 may have a same, current pose of the actual robot in the robotic operating environment. At the beginning of the process 400, the first virtual robot 420 may have an initial pose (same as an initial pose of the actual robot) that defines respective initial joint angles of one or more joints of the first virtual robot.

The system receives, within the interactive user interface, user input data specifying a target pose of the first virtual robot (step 404). As described above, the user input data may be entered in any of a variety of ways by using an input device in data communication with the interactive user interface. The user input data may define or otherwise specify a target position and a target orientation of an end effector of the first virtual robot with reference to a given coordinate system.

The system generates and displays, within the interactive user interface, an animation of the first virtual robot transitioning between the initial pose and the target pose (step 406). That is, in some implementations, in response to receiving the user input data specifying the target pose, the system causes the robot to traverse to the target pose specified by the received user input data, and updates in real-time the illustration of the first virtual robot as the robot traverses to have the target pose specified by the received user input data. To generate the animation of the first virtual robot moving to the target pose, the system can use robot configuration data received from a robot motion controller of the robot, e.g., by streaming readings of current robot joint parameter values, to determine the current pose of the robot. The system could also use sensor data received from one or more sensors (e.g., camera, LiDAR, or radar sensors) making observations in the robot operating environment.

In some of these implementations where the user input data is generated by drag operation, the system can generate and display the animation of the first virtual robot moving along with the drag operation. When doing so the system employs techniques to ensure that resulting animations look intuitive, organic, and responsive, thereby making it easier for the user to control the robot for any of a variety of tasks.

In particular, the system computes a plurality of intermediate points between the initial pose and the target pose (step 408). The plurality of intermediate points generally correspond to midway points along a path that the robot traverses to arrive at the target pose from the initial pose. The intervals between each pair of neighboring midway points along the path can be determined based on the aspects of robot configuration, robot motion (e.g., robot joint velocity), or both. Additionally or alternatively, the intervals between each pair of neighboring midway points along the path can be determined based on other hardware or software aspects of the system, including specifics of the inverse kinematics solver, performance of the input device (e.g., input latency), performance of the output device (e.g., frame refresh rate or rendering rate), communication latency between different components of the system, or a combination thereof and possible more.

The system repeatedly performs an inverse kinematics process to compute respective joint angles for each of the plurality of intermediate points between the initial pose and the target pose (step 410). Specifically, the system can do this by using an inverse kinematics (IK) solver, e.g., by using an application programming interface (API) offered by an IK solver running at a server that is in communication with the system over a data communication network. The inverse kinematics solver implements software that is configured to calculate joint configurations for a desired end effector pose based on a rigid body tree model that is specific to the robot. During each iteration of the inverse kinematics process, the inverse kinematics solver can be used to determine joint angles of a robot model to achieve a desired end effect position and orientation that corresponds to a respective intermediate point.

The system repeatedly updates the illustration of the first virtual robot according to the computed joint angles for each of the plurality of intermediate points between the initial pose and the target pose (step 412). That is, the system generates and displays an animation of the robot traversing through the intermediate poses that correspond to the plurality of intermediate points to arrive at the target pose from the initial pose. The animation can include a sequence of visual frames, where each intermediate pose of the robot corresponds to one or more of the visual frames in the sequence.

Predictable intervals between visual frames may produce the human perception of smooth motion of the robot traversing through the intermediate poses. However, the amount of time required in each inverse kinematics process to find a solution may vary, e.g., due to solver complexity or network latency or both, and correspondingly the intervals between the visual frames may become unpredictable. In fact, very few existing IK solvers actually provide real-time solutions. In addition, in some cases, there exists either no solution, or infinitely many solutions to the inverse kinematic problem for certain intermediate poses for a robot with certain configurations. To account for the time variation in the inverse kinematics process, the system uses animation to make any delay in the process less apparent to a human viewer. This enhances viewer experiences and makes robot programming easier.

Figure 5:
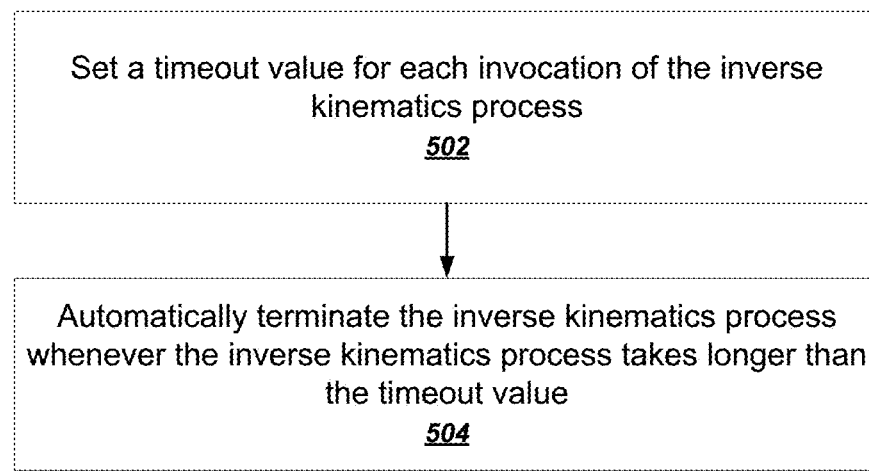
FIG. 5 is a flowchart of an example process for performing an inverse kinematics process.

FIG. 5 is a flowchart of an example process 500 for performing an inverse kinematics process. For convenience, the process 500 will be described as being performed by a system of one or more computers located in one or more locations. For example, a system, e.g., the robotic control system 150 of FIG. 1, appropriately programmed, can perform the process 500.

The system sets a timeout value for each invocation of the inverse kinematics process (step 502). For example, the timeout value can be a predetermined value that is minimally required to reconstruct smooth motion. As another example, the timeout value can be a user-specified value provided by a user of the system through the interactive user interface, depending on the actual needs of real-world robotic applications. The timeout value can be provided in a number of seconds, or fractions of a second, e.g., in milliseconds or nanoseconds. In general, a lower timeout value leads to a higher frame rate, i.e., more frames per second, which in turn provides an appearance of smoother motion.

The system automatically terminates the inverse kinematics process whenever the inverse kinematics process takes longer than the timeout value (step 504). In particular, whenever an invocation of the inverse kinematics process for an intermediate point is terminated, the system invokes the inverse kinematics process for a next intermediate point without waiting for an inverse kinematics solution to be computed and returned for the intermediate point that was terminated. The system meanwhile generates an animation from a preceding intermediate pose (corresponding to the immediately preceding intermediate point) to a next intermediate pose (corresponding to the immediately subsequent intermediate point). In other words, when generating the illustration, the system drops any intermediate pose the inverse kinematics solution for which is taking longer than the timeout value to compute, and uses animation to portray the robot motion of transitioning through the two immediately neighboring intermediate poses of the dropped intermediate pose. To animate over the dropped intermediate pose, the system can take into account of current robot motion information (e.g., robot joint velocity). This makes the user interface more responsive and helps to reconstruct a smoother motion in human perception.

In some implementations, the system additionally generates a visual indication of a difference between the target pose and the current pose of the robot. In these implementations, the system generates an illustration of a second virtual robot that has the target pose and withholds causing the robot in the robotic operating environment to traverse to the target pose until, e.g., a user command is received, a certain amount of time has elapsed since the target pose is defined, or the like.

Figure 6:
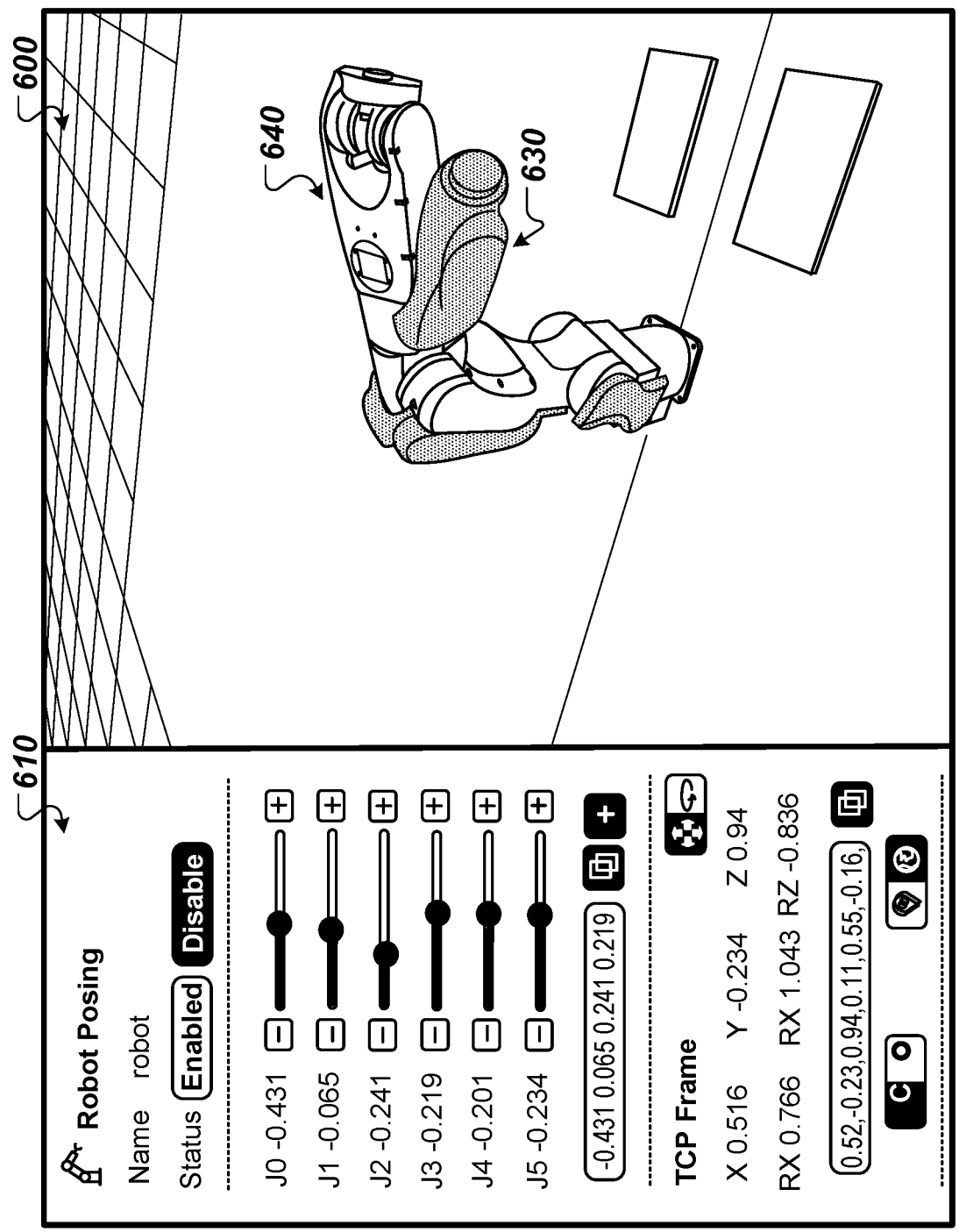
FIG. 6 illustrates a further example interactive user interface for robot programming.

FIG. 6 illustrates a further example interactive user interface for robot programming. As shown, the interactive user interface may include a display window 600 which shows a 3D view of a second virtual robot 640. The second virtual robot 640 has the target pose defined by the user, e.g., through the visual programming interface 610 or some other different types of interface that may allow the user to enter input data. In the meantime, the interactive user interface shows the illustration of a first virtual robot 630 (that is a virtual replica of a robot in a robotic operating environment) that has the initial pose of the robot.

To visually emphasize the difference between the initial and target poses, the first virtual robot can be rendered according to a first set of presentation characteristics, and the second virtual robot can be rendered according to a second set of presentation characteristics that are visually distinguished from the first set of presentation characteristics. For example, the presentation characteristics may include color, fill pattern, transparency, brightness, and the like. In the particular example of FIG. 6, the illustration of the first virtual robot 630 is generated with opaque rendering.

Once the user command is received, the robot begins to move from the initial pose to the target pose, and interactive user interface can generate and display in real-time an updated illustration of the first virtual robot 630, to show the process of the first virtual robot 630 traveling toward (and eventually superimposing onto) the second virtual robot 640 which has the target pose.

In some implementations, once the robot arrives at the target pose defined by the pose data, the system can subsequently cause the robot to perform a manipulation operation on an object to perform a task.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached claims and the embodiments described above, the following numbered embodiments are also innovative:

Embodiment 1 is a method comprising:
  generating an interactive user interface that includes an illustration of a first virtual robot, the first virtual robot having an initial pose that defines respective joint angles of one or more joints of the first virtual robot;
  receiving, within the interactive user interface, user input data specifying a target pose of the first virtual robot; and
  generating, within the interactive user interface, an animation of the first virtual robot transitioning between the initial pose and the target pose, including:
    computing a plurality of intermediate points between the initial pose and the target pose,
    repeatedly performing an inverse kinematics process to compute respective joint angles for each of the plurality of intermediate points between the initial pose and the target pose, and
    repeatedly updating the illustration of the first virtual robot according to the computed joint angles for each of the plurality of intermediate points between the initial pose and the target pose.

Embodiment 2 is the method of claim 1, wherein repeatedly performing the inverse kinematics process comprises:
setting a timeout value for each invocation of the inverse kinematics process; and
automatically terminating the inverse kinematics process whenever the inverse kinematics process takes longer than the timeout value.

Embodiment 3 is the method of claim 2, wherein whenever an invocation of the inverse kinematics process for an intermediate point is terminated, invoking the inverse kinematics process for a next intermediate point without computing a solution for the intermediate point that was terminated.

Embodiment 4 is the method of claim 3, wherein generating the animation comprises generating an animation from a preceding intermediate pose to a next intermediate pose corresponding to the next intermediate point.

Embodiment 5 is the method of any one of claims 1-4, wherein the first virtual robot has a same, current pose of a robot in the robotic operating environment.

Embodiment 6 is the method of any one of claims 1-5, wherein generating the animation comprises generating a visual indication of a difference between the target pose and the current pose of the robot, including generating an illustration of a second virtual robot that has the target pose and withholding causing the robot in the robotic operating environment to traverse to the target pose until a user command is received.

Embodiment 7 is the method of claim 6, wherein generating the visual indication of the difference between the target pose and the current pose of the robot comprises:
rendering the first virtual robot according to a first set of presentation characteristics; and
rendering the second virtual robot according to a second set of presentation characteristics that are visually distinguished from the first set of presentation characteristics.

Embodiment 8 is the method of any one of claims 6-7, wherein generating the visual indication of the difference between the target pose and the current pose of the robot comprises:
updating in real-time the illustration of the second virtual robot to have the target pose specified by the received user input data.

Embodiment 9 is the method of any one of claims 6-8, further comprising, in response to receiving the user command:
causing the robot to traverse to the target pose specified by the received user input data; and
updating in real-time the illustration of the first virtual robot as the robot traverses to have the target pose specified by the received user input data.

Embodiment 10 is the method of any one of claims 6-9, wherein the presentation characteristics comprise colors, fill patterns, transparency, or brightness.

Embodiment 11 is the method of any one of claims 1-10, wherein generating the animation comprises:
receiving robot configuration data from a motion controller of the robot to determine the current pose of the robot.

Embodiment 12 is the method of any one of claims 1-11, wherein the user input data comprises drag input data.

Embodiment 13 is the method of any one of claims 1-12, wherein the user input data is generated by using an augmented reality (AR) or virtual reality (VR) input device.

Embodiment 14 is the method of any one of claims 1-13, wherein the pose of the robot comprises a position and an orientation of an end effector of the robot.

Embodiment 15 is the method of claim 14, wherein the end effector comprises a grasping end effector, a welding device, or a gluing device.

Embodiment 16 is a system comprising: one or more computers and one or more storage devices storing instructions that are operable, when executed by the one or more computers, to cause the one or more computers to perform the method of any one of claims 1 to 15.

Embodiment 17 is a computer storage medium encoded with a computer program, the program comprising instructions that are operable, when executed by data processing apparatus, to cause the data processing apparatus to perform the method of any one of claims 1 to 15.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
generating an interactive user interface that includes an illustration of a first virtual robot, the first virtual robot having an initial pose that defines respective joint angles of one or more joints of the first virtual robot;
receiving, within the interactive user interface, user input data specifying a target pose of the first virtual robot; and
generating, within the interactive user interface, an animation of the first virtual robot transitioning between the initial pose and the target pose, including:
computing a plurality of intermediate points between the initial pose and the target pose,
repeatedly performing an inverse kinematics process to compute respective joint angles for each of the plurality of intermediate points between the initial pose and the target pose, wherein repeatedly performing the inverse kinematics process comprises:
setting a timeout value for each invocation of the inverse kinematics process;
automatically terminating the inverse kinematics process whenever the inverse kinematics process takes longer than the timeout value; and
whenever an invocation of the inverse kinematics process for an intermediate point is terminated, invoking the inverse kinematics process for a next intermediate point without computing a solution for the intermediate point that was terminated, and
repeatedly updating the illustration of the first virtual robot according to the computed joint angles for each of the plurality of intermediate points between the initial pose and the target pose.

2. The method of claim 1, wherein generating the animation comprises generating an animation from a preceding intermediate pose to a next intermediate pose corresponding to the next intermediate point.

3. The method of claim 1, wherein the first virtual robot has a same, current pose of a robot in a robotic operating environment.

4. The method of claim 3, wherein generating the animation comprises generating a visual indication of a difference between the target pose and the current pose of the robot, including generating an illustration of a second virtual robot that has the target pose and withholding causing the robot in the robotic operating environment to traverse to the target pose until a user command is received.

5. The method of claim 4, wherein generating the visual indication of the difference between the target pose and the current pose of the robot comprises:
rendering the first virtual robot according to a first set of presentation characteristics; and
rendering the second virtual robot according to a second set of presentation characteristics that are visually distinguished from the first set of presentation characteristics.

6. The method of claim 5, wherein the presentation characteristics comprise colors, fill patterns, transparency, or brightness.

7. The method of claim 4, wherein generating the visual indication of the difference between the target pose and the current pose of the robot comprises:
updating in real-time the illustration of the second virtual robot to have the target pose specified by the user input data.

8. The method of claim 4, further comprising, in response to receiving the user command:
causing the robot to traverse to the target pose specified by the user input data; and
updating in real-time the illustration of the first virtual robot as the robot traverses to have the target pose specified by the received user input data.

9. The method of claim 1, wherein generating the animation comprises:
receiving robot configuration data from a motion controller of the robot to determine the current pose of the robot.

10. The method of claim 1, wherein the user input data comprises drag input data.

11. The method of claim 1, wherein the user input data is generated by using an augmented reality (AR) or virtual reality (VR) input device.

12. The method of claim 1, wherein the pose of the robot comprises a position and an orientation of an end effector of the robot.

13. The method of claim 12, wherein the end effector comprises a grasping end effector, a welding device, or a gluing device.

14. One or more non-transitory computer-readable storage media storing instructions that when executed by one or more computers cause the one or more computers to perform operations comprising:
generating an interactive user interface that includes an illustration of a first virtual robot, the first virtual robot having an initial pose that defines respective joint angles of one or more joints of the first virtual robot;
receiving, within the interactive user interface, user input data specifying a target pose of the first virtual robot; and
generating, within the interactive user interface, an animation of the first virtual robot transitioning between the initial pose and the target pose, including:
computing a plurality of intermediate points between the initial pose and the target pose,
repeatedly performing an inverse kinematics process to compute respective joint angles for each of the plurality of intermediate points between the initial pose and the target pose, wherein repeatedly performing the inverse kinematics process comprises:
setting a timeout value for each invocation of the inverse kinematics process;
automatically terminating the inverse kinematics process whenever the inverse kinematics process takes longer than the timeout value; and
whenever an invocation of the inverse kinematics process for an intermediate point is terminated, invoking the inverse kinematics process for a next intermediate point without computing a solution for the intermediate point that was terminated, and
repeatedly updating the illustration of the first virtual robot according to the computed joint angles for each of the plurality of intermediate points between the initial pose and the target pose.

15. A system comprising one or more computers and one or more storage devices storing instructions that when executed by one or more computers cause the one or more computers to perform operations comprising:
generating an interactive user interface that includes an illustration of a first virtual robot, the first virtual robot having an initial pose that defines respective joint angles of one or more joints of the first virtual robot;
receiving, within the interactive user interface, user input data specifying a target pose of the first virtual robot; and
generating, within the interactive user interface, an animation of the first virtual robot transitioning between the initial pose and the target pose, including:
computing a plurality of intermediate points between the initial pose and the target pose,
repeatedly performing an inverse kinematics process to compute respective joint angles for each of the plurality of intermediate points between the initial pose and the target pose, wherein repeatedly performing the inverse kinematics process comprises:
setting a timeout value for each invocation of the inverse kinematics process;
automatically terminating the inverse kinematics process whenever the inverse kinematics process takes longer than the timeout value; and
whenever an invocation of the inverse kinematics process for an intermediate point is terminated, invoking the inverse kinematics process for a next intermediate point without computing a solution for the intermediate point that was terminated, and
repeatedly updating the illustration of the first virtual robot according to the computed joint angles for each of the plurality of intermediate points between the initial pose and the target pose.

16. The system of claim 15, wherein generating the animation comprises generating an animation from a preceding intermediate pose to a next intermediate pose corresponding to the next intermediate point.

17. The system of claim 16, wherein generating the animation comprises generating a visual indication of a difference between the target pose and the current pose of the robot, including generating an illustration of a second virtual robot that has the target pose and withholding causing the robot in the robotic operating environment to traverse to the target pose until a user command is received.

18. The system of claim 17, wherein generating the visual indication of the difference between the target pose and the current pose of the robot comprises:
- rendering the first virtual robot according to a first set of presentation characteristics; and
- rendering the second virtual robot according to a second set of presentation characteristics that are visually distinguished from the first set of presentation characteristics.

19. The system of claim 17, wherein generating the visual indication of the difference between the target pose and the current pose of the robot comprises:
- updating in real-time the illustration of the second virtual robot to have the target pose specified by the user input data.

20. The system of claim 17, wherein the operations further comprise, in response to receiving the user command:
- causing the robot to traverse to the target pose specified by the user input data; and
- updating in real-time the illustration of the first virtual robot as the robot traverses to have the target pose specified by the received user input data.

* * * * *